Dec. 8, 1942.                    C. E. EMMER                    2,304,629
              MACHINE FOR FORMING PLASTIC BINDINGS
                Filed April 3, 1939          6 Sheets-Sheet 1
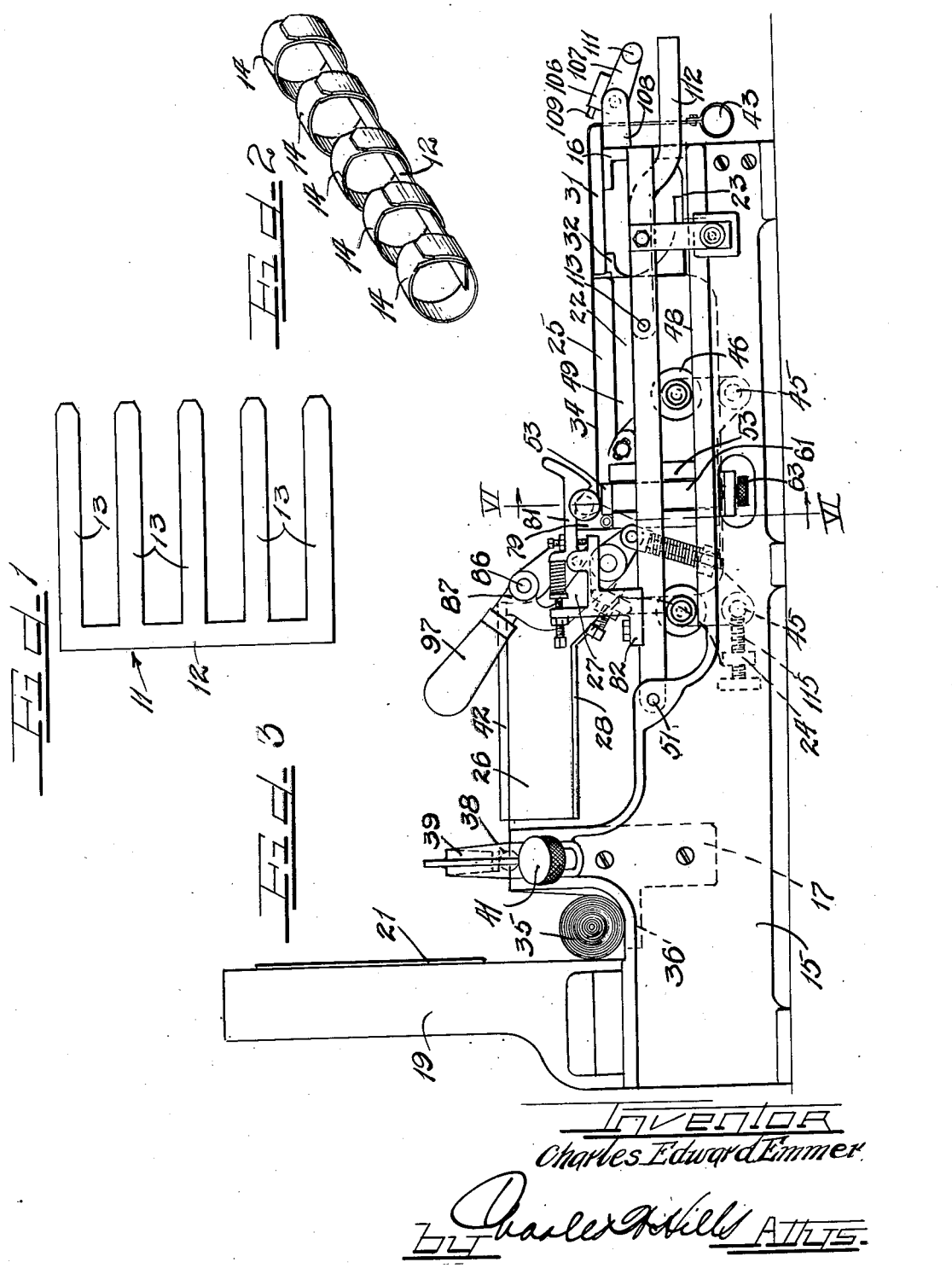
Inventor
Charles Edward Emmer
by Charles H. Hills Attys.

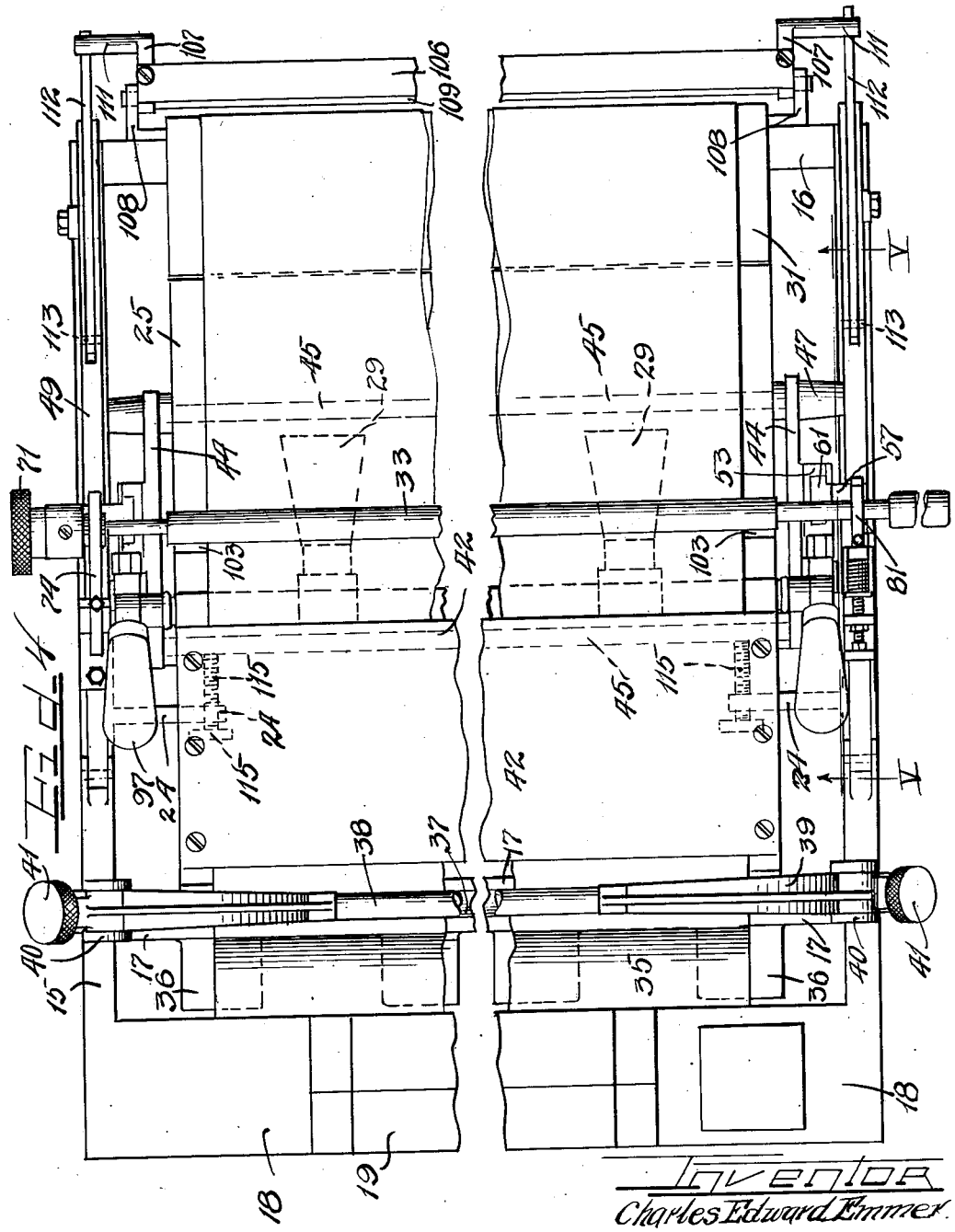

Dec. 8, 1942.  C. E. EMMER  2,304,629
MACHINE FOR FORMING PLASTIC BINDINGS
Filed April 3, 1939  6 Sheets-Sheet 3
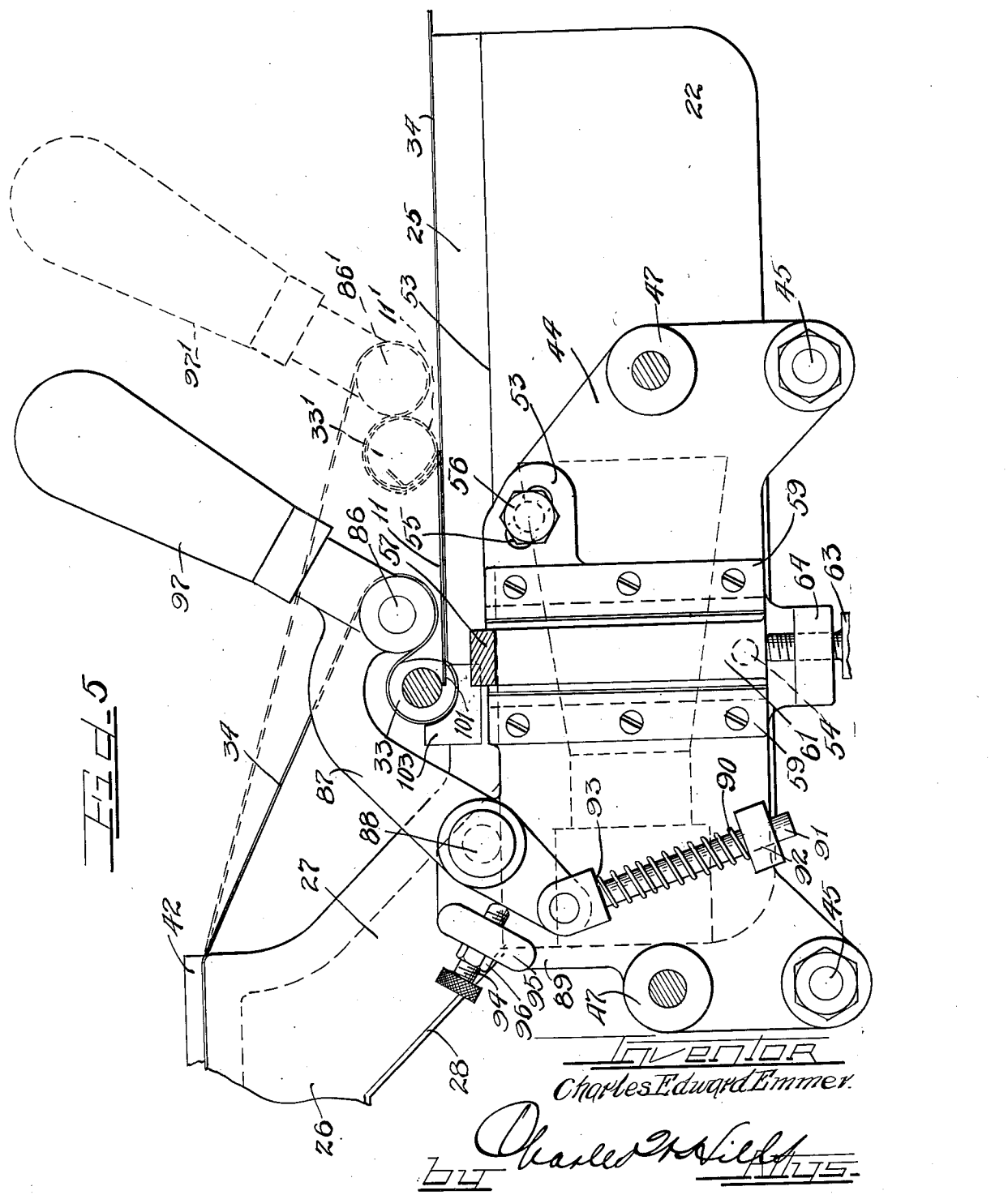

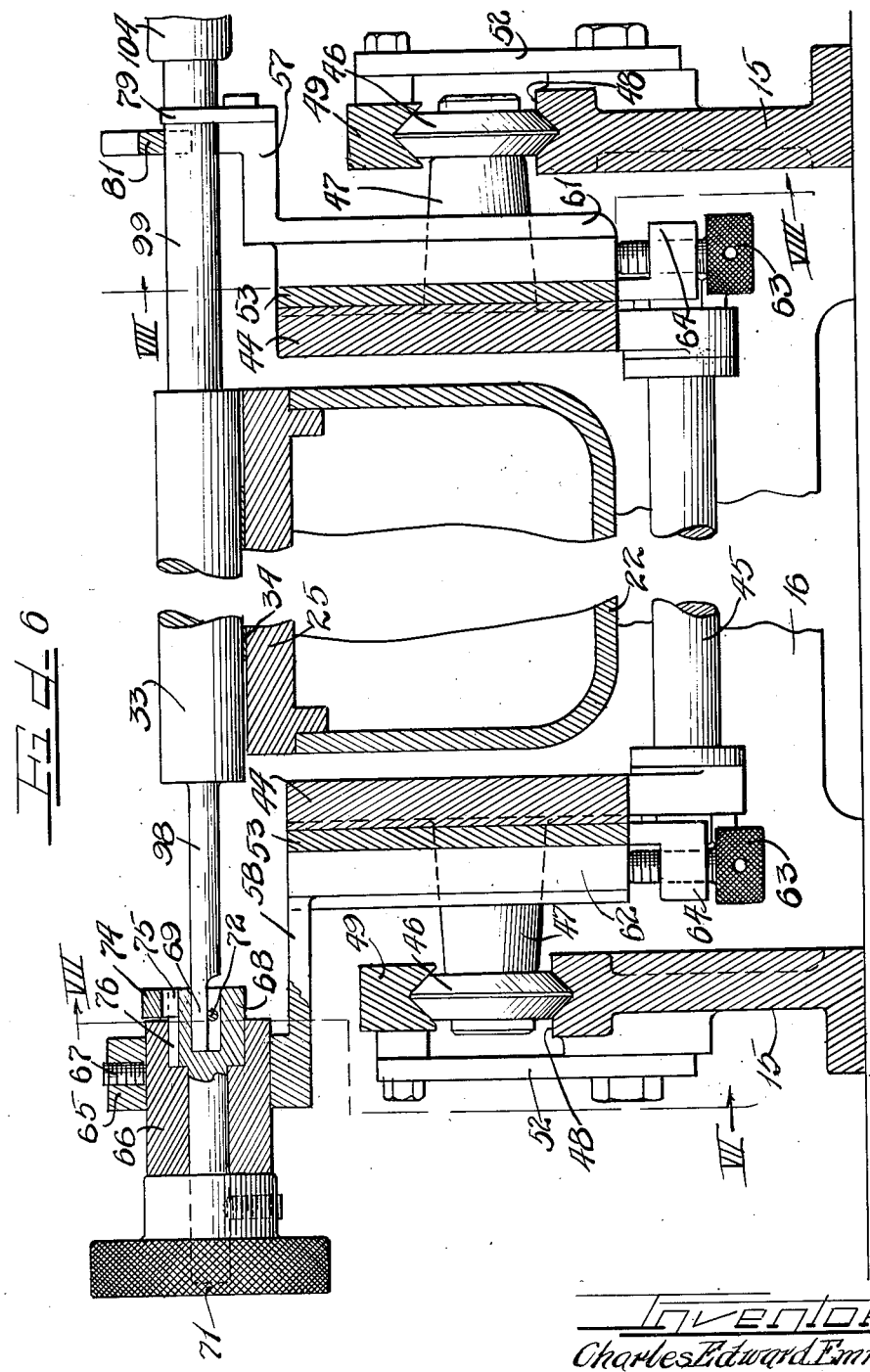

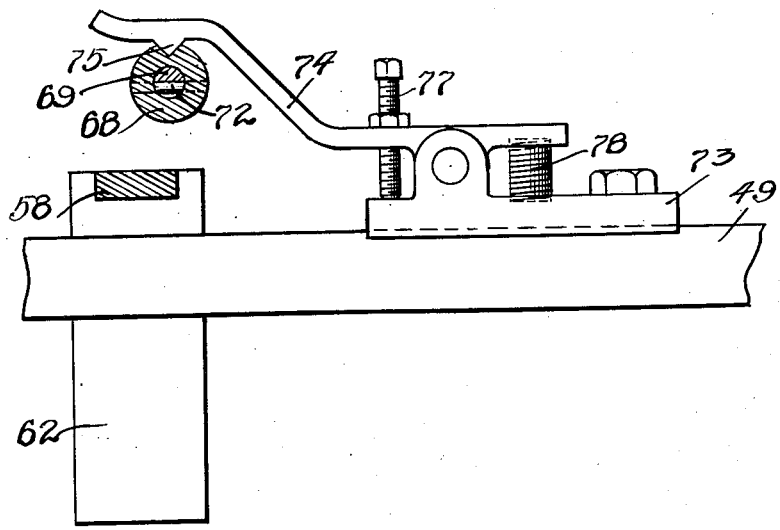
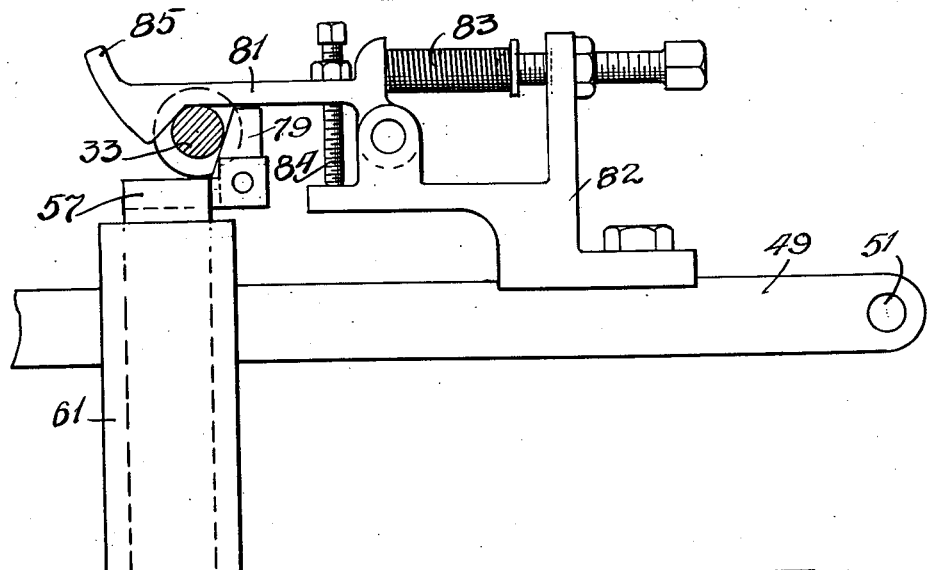

Dec. 8, 1942. C. E. EMMER 2,304,629
MACHINE FOR FORMING PLASTIC BINDINGS
Filed April 3, 1939 6 Sheets-Sheet 6
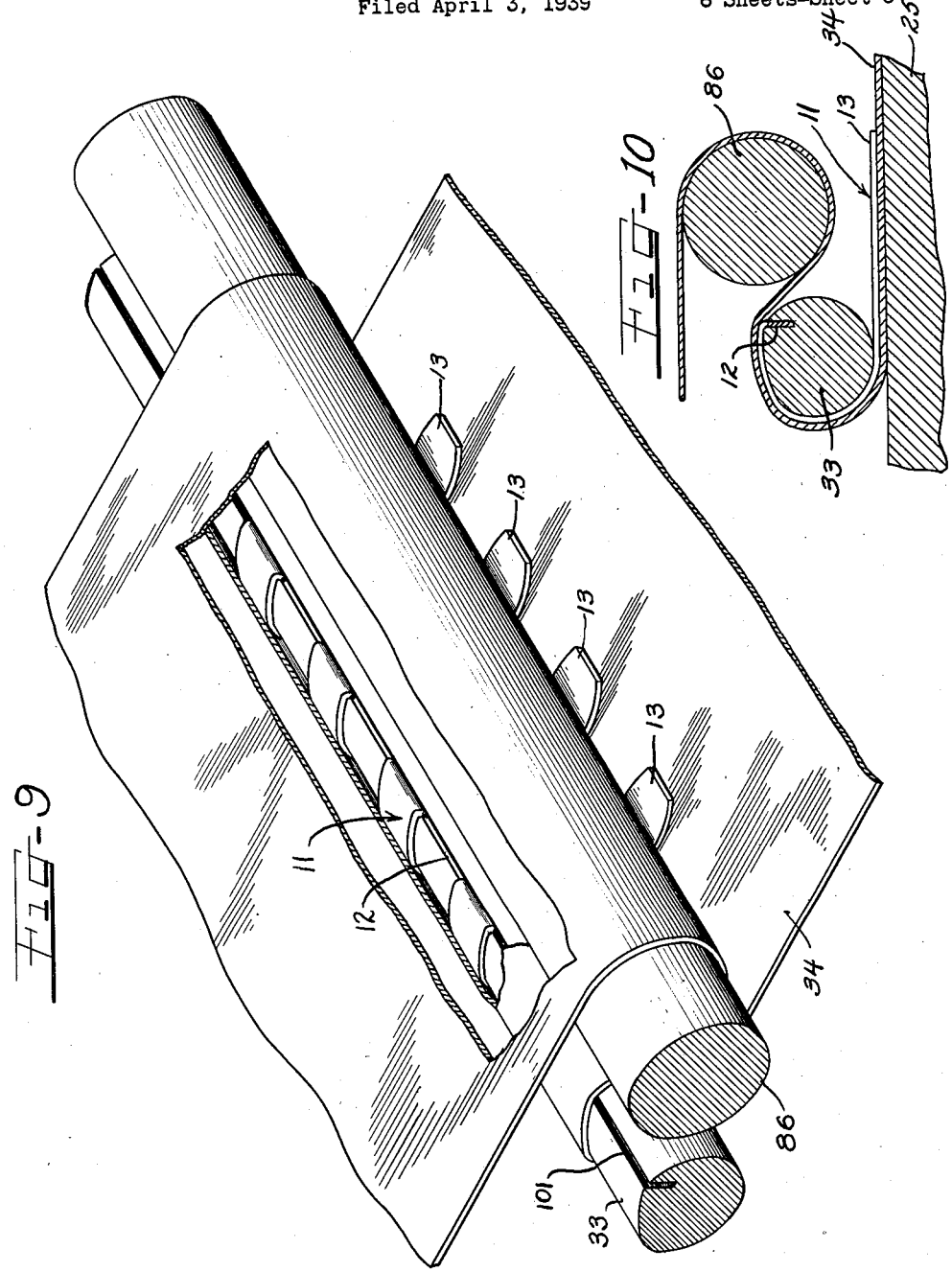
Inventor
Charles Edward Emmer
by Charles... Attys Patented Dec. 8, 1942

2,304,629

UNITED STATES PATENT OFFICE 2,304,629

MACHINE FOR FORMING PLASTIC BINDINGS

Charles Edward Emmer, Chicago, Ill., assignor to General Binding Corporation, Chicago, Ill., a corporation of Illinois.

Application April 3, 1939, Serial No. 265,861

11 Claims. (Cl. 18—19)

This invention relates to a machine for forming plastic bindings of the type shown in Figure 2 of the drawings from a piece of sheet plastic, such as Celluloid, having the shape shown in Figure 1 of the drawings.

One of the principal objects of this invention is to provide a machine of this character which can be operated more rapidly and more conveniently than the machines in use prior to this invention.

Another object of this invention is to provide a machine for forming plastic bindings of the general type shown in Figure 2, each binding having a longitudinally extending back 12 lying in a plane which intersects the rings 14 of the binding instead of being tangent to them.

Another object of this invention is to provide a machine having an arbor about which a blank is formed into a binding by a piece of cloth held tightly around the arbor by a roller, and in which means are provided for allowing the cloth to become slack when the arbor and the completed binding are being removed from the machine.

Another object of the invention is to provide a machine having an arbor about which a blank is to be formed into a binding, the arbor having a longitudinal slot for receiving the back of the blank, so that the back of the completed binding will extend in at an angle to the rings of the binding.

A further object of this invention is to provide a machine for forming plastic bindings and having a convenient place for pre-heating the blanks of plastic material before they are formed into bindings.

A further object of this invention is to provide a machine for forming plastic bindings which can be readily adjusted for forming bindings of different sizes for binding books or pamphlets of different thicknesses.

A still further object of this invention is to provide a machine for forming plastic bindings which can be operated very rapidly so that a large number of bindings may be produced on a single machine.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a plan view of a blank of plastic material, such as Celluloid, to be formed into a binding by my improved machine;

Figure 2 is a perspective view of a completed binding formed by my machine;

Figure 3 is a side elevational view of the machine forming one preferred embodiment of my invention;

Figure 4 is a plan view of the machine shown in Figure 3;

Figure 5 is a section on an enlarged scale, taken on the line V—V of Figure 4, looking in the direction of the arrows.

Figure 6 is a cross-section on an enlarged scale, taken on the line VI—VI of Figure 3, looking in the direction of the arrows;

Figure 7 is a section taken on the line VII—VII of Figure 6, looking in the direction of the arrows;

Figure 8 is a section taken on the line VIII—VIII of Figure 6, looking in the direction of the arrows.

Figure 9 is a perspective view illustrating the method of operation of the machine; and Figure 10 is a cross-section illustrating the method of operation of the machine.

The machine shown in the drawings is designed to take a blank 11 which is made of Celluloid or other thermoplastic material and shaped as shown in Figure 1, and to form this blank into a binding having the shape shown in Figure 2. The finished binding in itself forms no part of the present invention, and the manner of using it is described in my co-pending application entitled "Plastic binding," Serial No. 227,242, filed August 29, 1938. The blank 11 is shaped like a comb and comprises a back 12 and a plurality of teeth 13 extending perpendicularly to the back 12. Although Celluloid is the best material of which I am aware at the present time for making plastic bindings of this character, the blank 11 may be formed of any other plastic or other material which can be caused to take a permanent set either by working it while warm and then allowing it to cool or in some other manner.

In the complete binding, as shown in Figure 2, the back 12 extends longitudinally and the fingers 13 have been curled into rings 14 which may either be circular or have some other special shape. In the preferred form of binding which is shown in Figure 2, the rings 14 are not circular but have two portions of different curvatures. The quarter of each ring at one side of the back 12 have about one-half of the curvature of the remainder of the ring. The purpose of this is fully explained in my abovementioned co-pending application.

The framework of the machine is formed of a pair of side frames 15 which are joined together at the front of the machine by a cross-member 16 and near the rear of the machine by a cross-member 17. At the extreme rear of the machine, the side frames 15 are provided with inwardly extending integral brackets 18 which support and are joined together by an instrument case 19 securely fastened to them. The instrument case 19 contains a combined temperature indicating device and thermostatic control unit 21, whose purpose will be described below.

A heating box 22 extends across near the front of the machine, which is at the left in Figures 3 and 4, and is supported by brackets 23, projecting back from the front cross-member 16, and brackets 24, projecting in from the side frames 15. The top of the heating box 22 is covered by a heating plate 25 which is made integral with a pre-heating box 26 located above and behind the heating box 22. The heating plate 25 and the pre-heating box 26 are joined by a connecting portion 27, whose shape, in cross-section, is similar to an inverted trough. This allows heated air from the heating box 22 to rise up into the pre-heating box 26 and maintains it at a suitable temperature. A bottom plate 28 closes the underside of the pre-heating box 26 and the connecting portion 27 and prevents the escape of warm air.

The heating box 22 contains a plurality of electric heating elements 29 by which it is maintained at the proper temperature. The heating box 22 also contains a temperature responsive element which is connected to the temperature indicating device and thermostatic control unit 21, the latter in turn being arranged to control the supply of electricity to the electric heating element 29. The details of this arrangement are conventional in character and do not form a novel part of the present invention and are therefore not illustrated.

At the front of the machine, the working surface provided by the heating plate 25 is extended by a board 31 supported on the front cross-member 16 and on brackets 32 integral with the heating box 22.

The actual forming of the blank 11 shown in Figure 1 into the finished binding shown in Figure 2 is accomplished on the surface of the heating plate 25 by means of an arbor 33 and a sheet of cloth or other suitable flexible material, such as tough paper 34. The cloth or paper 34 wears out rapidly when the machine is in use, so I provide a roll 35 of this material which is supported on brackets 36 on the back of the rear cross-member 17 just ahead of the instrument case 19. From the roll 35, the cloth 34 leads over the top of the rear cross-member 17 which is provided with a groove 37 into which the cloth 34 is clamped by means of a rod 38. The rod 38 is pressed down upon the cloth 34 by means of a pair of arched levers 39 extending in from the sides of the machine. Each of the levers 39 is pivoted at 40 on one of the side frame members 15 and its extreme end is provided with a screw 41 threaded through it and bearing against a portion of the side frame 15, so that, by turning down the screw 41, the inner end of the lever 39 will be made to press the rod 38 down on top of the cloth 34 where it crosses the groove 37.

From the clamping arrangement provided by the groove 37 and the rod 38, the cloth 34 passes over the top of the pre-heating box 26 toward the front of the machine. A pre-heating plate 42 is located above the cloth 34 at this point and provides a smooth, stationary metallic surface upon which the blank to be worked upon may be placed for pre-heating. This construction is superior to a construction in which the pre-heating plate 42 is omitted and the blanks are placed directly upon the cloth, because it has been found that the blanks absorb heat better and more evenly from a smooth metallic surface. It has also been found that when the blanks are allowed to rest directly upon the cloth 34 without the interposition of the pre-heating plate 42, the movement of the cloth 34 when the machine is being operated occasionally causes accidental displacement of the blanks. The use of the pre-heating plate 42 eliminates such accidental movement.

From between the pre-heating box 26 and the pre-heating plate 42, the cloth 34 extends down under the mandrel 33 and forward along the top of the heating plate 25 and the board 31, and hangs down at the front of the machine. The end of the cloth at the front of the machine is provided with a weight 43 for holding the cloth 34 tight. If desired, the weight 43 may be provided with means by which it can be quickly clamped onto the cloth in the desired position whenever a new length of cloth is brought into use.

The arbor 33 is rolled along on top of the cloth 34 by means of a carriage to which it is connected. The carriage comprises a pair of side members 44 located between the side frames 15 of the machine on each side of the heating box 22 and heating plate 25. The two sides 44 of the carriage are connected together by tie rods 45 which extend across the machine beneath the heating box 22, and they are provided with wheels 46 mounted at the ends of outwardly projecting bosses 47. The wheels 46 have a V-shaped tread and roll in milled V-shaped grooves along the tops of the side frames 15, the grooves forming tracks 48 for the wheels. In order to keep the wheels 46 in the tracks 48, upper tracks or retainers 49 are provided. The upper tracks 49 are formed with V-shaped grooves on their under sides and they are secured to the side frames 15 by suitable bolts 51 and brackets 52 in such a position as to engage the tops of the wheels 46 and to prevent them from being displaced from the lower tracks 48.

Each of the side members 44 of the carriage has a guide or slide 53 adjustably secured to its outer side. The slides or guides 53 are pivoted to the carriage side members 44 by studs 54 which are riveted into holes near the lower ends of the guides or slides 53 and which are journalled in holes in the carriage side members 44. The upper ends of the guides 53 are provided with slots 55 through which extend bolts 56 for securing them to the carriage side members 44. The slots 55 may be made in the form of arcs with their centers at the pivots 54, but it has been found sufficient to make them straight and place them perpendicular to a line drawn from their centers to the pivots 54, and to provide a slight clearance in the slots 55 at either side of the screws 56. This construction allows the guides 53 to be swung forward or backward and to be held in any desired position within their range of movement by means of the screws 56.

Each of the guides 53 carries one of a pair of arbor supports 57 and 58 which serve to position the arbor 33 relative to the carriage. The outer surface of each of the guides 53 is formed with a vertically extending rectangular groove and is provided with a pair of gibs 59 overhanging the edges of the groove and converting it into a T-slot. The T-slots thus provided form the actual guides for the arbor supports 57 and 58, which are provided with vertical slide portions 61 and 62 which fit in the T-slots. The slide portions 61 and 62 of the two arbor supports 57 and 58 are supported at the proper height in their guides 53 by means of adjusting screws 63 threaded through brackets 64 on the lower ends of the guides 53 and bearing against the lower ends of the slide portions 61 and 62.

Although the lower portions of the two arbor supports 57 and 58 are alike, their upper portions which engage the arbor differ from each other. The arbor support 58 on one side of the machine comprises a bracket extending out beyond the tracks 49 and terminating in collar 65 concentric with the axis of the arbor 33. The collar 65 carries a bearing 66 which is axially slidable in the collar and is held in the proper position by a set screw 67 in the collar. A socket 68 for receiving one end 69 of the arbor 33 is journalled in the bearing 66 and is provided with a hand wheel 71 by means of which its angular position in the bearing 66 may be readily adjusted.

The end 69 of the arbor 33 which fits into the socket 68 is semi-cylindrical in shape, and the socket 68, which has a circular hole to receive the end 69 of the arbor, is provided with a transverse pin 72 placed so as to bear against the flat side of the semi-cylindrical end 69 of the arbor and permit it to be inserted in the socket 68 in only one predetermined angular position with respect to it. Means are also provided for holding the socket 68 in a predetermined angular position when the carriage is at the rearmost or initial position. This means comprises a bracket 73 mounted upon the upper track or rail 49 and having a forwardly extending arm 74 pivoted to it. The end of the arm 74 is provided with a downwardly facing detent 75 which is adapted to fit into a notch 76 in the periphery of the socket 68. An adjustable stop 77 prevents the arm 74 from swinging down below a position from which it will rise up on top of the socket 68 as the carriage is moved back to its rearmost position, and a spring 78 tends to swing the arm down so that the detent 75 will snap down into the notch 76 when the socket 68 is rotated to the proper position by means of the hand wheel 71.

The other arbor support 57 has its upper portion formed into a bracket extending over the tracks 49 and forming a rest for the arbor 33. This supports the arbor vertically. The arbor support also carries an upright stop 79 which projects up behind the arbor 33 and limits its movement in a backward direction. Forward movement of this end of the arbor is restrained by a catch 81 pivotally carried by a bracket 82 secured on top of the rail 49 behind the arbor 33. The catch 81 is held in operative position by a spring 83 and is prevented from moving beyond this position by means of an adjustable stop screw 84. The end of the catch 81 is formed into an upwardly sloping cam surface, so that the catch 81 will be automatically lifted as the arbor 33 is moved back towards the position shown in Figures 3 and 8. The end 85 of the catch 81 extends forwardly and upwardly and forms a convenient means for releasing the catch when it is desired to move the carriage and the arbor 33 forward from the position shown in Figure 3.

Besides the arbor 33, the carriage formed by the side members 44 and tie rods 45 also carries a form roller 86 by means of which the cloth 34 is wrapped approximately three-quarters of a turn around the arbor 33. The form roller 86 is not carried directly by the carriage side members 44 but has its ends journalled in a pair of levers 87 journalled on studs 88 fixed to the carriage side members 44. The studs 88 are located near the top of the carriage and in back of the position of the arbor 33 so that the form roller 86 can be swung from a position above and behind the arbor 33 down over the arbor to a position immediately in front of it, as shown in Figure 5. The levers 87 are each provided with an over-center spring mechanism which resiliently holds them in either of their extreme positions. This mechanism comprises an extension 89 of the lever 87 below its pivot 88. A spring rod 91 extending down through a guide 92, which is oscillatably mounted near the bottom of the carriage side members 44, is pivoted to the extension 89.

A coil spring 90 fits around the spring rod 91 and presses against the top of the guide 92 and a downwardly facing shoulder 93 at the upper end of the spring rod 91, thus tending to move the spring rod 91 upwardly toward the pivot 88 of the form roller lever 87. Thus, the two springs 90, one at either side of the machine, will resiliently hold the levers 87 in either of their extreme positions. The position of the form roller 86 when it is swung forward and down in front of the arbor 33 is adjusted by means of a pair of stop screws 94, one on either side of the machine, which are threaded through lugs 95 on the sides of the carriage side members 44 and bear against the edges of the lower ends 89 of the form roller levers 87. The adjusting screws 94 are provided with lock nuts 96 and are set so that the form roller 86 will be spaced just far enough above the heating plate 25 to allow for two thicknesses of the cloth 34, the thickness of the blank 11 and a slight amount of clearance.

The upper ends of the form roller levers 87 are provided with handles 97 by means of which the form roller 86 is swung from one position to another, and which also serve as a means of moving the entire carriage. The handles 97 are placed so that, when they are swung forward, one finger of the hand grasping one of the handles 97 can readily be extended to lift the projecting end 85 of the catch 81 which holds the arbor 33 against forward movement. This operation releases the arbor 33 and with it the entire carriage for forward movement.

The arbor 33 may be circular in cross-section and be without any longitudinal grooves, in case it is desired to form bindings having the same curvature all around and having the backs lying flat against the sides of the fingers, but in order to produce the improved form of binding shown in Figure 2, it is necessary that a special form of arbor 33 be employed. The end portions 98 and 99 of the arbor 33 may be circular in cross-section, except for the extreme end 69 which fits into the socket 68 and is semi-circular in cross-section. The central portion of the arbor, which extends from one side of the heating plate to the other, has a non-circular cross-section, as may be seen in end elevation in Figure 5 and also in Figures 9 and 10. The major portion of the outline of the cross-section of this portion is of constant curvature and forms about three-quarters of a circle. At one end of this portion of the cross-section, there is a deep, narrow slot extending into the body of the arbor in a plane which is approximately parallel to a plane bisecting the three-quarters of a circle mentioned above. The remainder of the cross-section is formed by an arc having approximately one-half of the curvature of the above-mentioned three-quarters of a circle and extends from one side of the slot 101 to one end of the three-quarters of a circle, the other side of the slot 101 and the other end of the three-quarters of a circle being contiguous.

At the beginning of the operation of forming a binding, the arbor 33 does not rest upon the surface of the heating plate 25 but fits down within a hollow in the upper surface of an inset 103 placed in a deep groove in the top of the heating plate 25. The depth of the hollow in the inset 103 is such that when the arbor 33 is resting in the hollow with the cloth 34 passing beneath it and with its slot 101 horizontal, a blank 11 can be slid along the surface of the cloth 34 and its edge will slide into the slot 101. The semi-circular end 69 on the arbor, the notch 76 in the socket 68 which receives the end 69 of the arbor, and the detent 75 which fits into the notch 76 are placed so that they will hold the arbor 33 with the slot 101 horizontal, as shown in Figure 5.

In the operation of the machine, the arbor 33 is placed in the position shown in Figures 3 to 8, inclusive, and a blank 11 is slid along the surface of the cloth 34 into the slot 101 in the arbor. The handles 97 on the form roller levers 87 are then swung forward from the position shown in Figure 3 to the position shown in full lines in Figure 5, and the form roller 86 is carried over and down in front of the arbor 33, winding the cloth 34 approximately three-quarters of a turn around the arbor. The catch 81 which holds the arbor against forward movement is then released by the fingers of the hand grasping one of the handles 97, and the entire carriage is moved forward by pulling the handles 97 towards the front of the machine. As this occurs, the cloth 34 will be drawn around the forming roller 86 and the arbor 33 like a belt leading over a pair of pulleys and will cause both the forming roller 86 and the arbor 33 to rotate.

The rotation of the forming roller 86 serves only to lessen friction, but the rotation of the arbor 33 causes the blank 11 to be wound around the arbor by the action of the cloth 34 as shown in Figures 9 and 10. When the handles 97, forming roller 86 and arbor 33 have been moved forward to the positions shown in dotted lines at 97', 86' and 33' in Figure 5, the blank 11 will have been formed around the arbor 33' as shown by the dotted lines 11' and will have assumed the finished form shown in Figure 2. The forming of the blank 11 into the finished binding in this fashion is facilitated by the fact that the blank 11 has been pre-heated by having been allowed to rest on the pre-heating plate 42 before being engaged in the mandrel 33 and by the fact that the heating plate 25 upon which the blank is rolled as it is being formed into final shape is warm enough to make the material of the blank plastic.

After the carriage has been drawn to the front of the machine and the blank 11 has been rolled into its finished shape, the handles 97 are swung back to their original position with respect to the remainder of the carriage. This swings the form roller 86 back out of the way and uncovers the arbor 33 having the completed binding formed around it. The arbor 33 is provided with a handle 104 at one end, by means of which it may be readily grasped and the other end 69 withdrawn from the socket 68. The mandrel 33 may then be removed from the machine and the completed binding may be slid off the mandrel, which may thereupon be replaced in the machine and the operation of forming a binding repeated with a new blank.

In order to facilitate the removal of the mandrel 33 from the machine, I have found it desirable to prevent the weight 43 from keeping the cloth 34 tight while this is being done. For this purpose, I have provided a bar 106 extending across the front of the machine and carried by levers 107 pivoted to brackets 108 which are carried by the front cross-member 16. The bar 106 carries a strip of rubber 109 which is placed so that, when the bar 106 swings back, the strip of rubber 109 clamps the cloth 34 against the edge of the board 31 which forms a continuation of the working surface of the heating plate 25. The ends 111 of the levers 107 extend laterally outward and are engaged by the ends of levers 112 which are mounted in vertical slots in the upper tracks 49 and swing vertically on pivots 113 carried by the tracks 49. The under surfaces of the levers 112 are provided with V-shaped grooves to receive the wheels 46 of the carriage, and they are curved so that the wheels 46 advancing toward the front of the machine as the carriage is moved forward will cause the levers 112 to swing upwardly and engage the ends 111 of the levers 109. Further movement of the carriage will cause the levers 112 to carry the levers 111 up with them and to press the strip of rubber 109 against the cloth 34 and clamp it in position.

When the end of the cloth 34 is thus clamped in position, the swinging of the forming roller 86 to a position in back of the arbor 33 provides considerable slack in the cloth and relieves the tension of the cloth against the arbor. This facilitates the removal of the arbor 33 and lessens the likelihood of the completely formed binding on the arbor being deformed by friction against the cloth 34 as the end 69 of the arbor is withdrawn from the socket 68.

After the completed binding has been slid off the mandrel 33, the mandrel may be replaced in position on the carriage, and the carriage returned to its original position, which is determined by adjustable stops 115 carried by brackets 24 in a position to engage one of the tie rods 45 of the carriage.

While only one size of mandrel has been shown in the drawings, provision has been made for replacing this mandrel with other mandrels of different diameters in order that bindings of different sizes may be made. The two arbor supports 57 and 58 can be adjusted vertically by means of the adjustable stop screws 63 so that they will support mandrels of different sizes at the proper height, and the inset 103 in the heating plate 25 can be replaced by other insets having grooves of different sizes to accommodate the different mandrels. The machine may also be used with round mandrels for producing bindings which are cylindrical in form, if such bindings are desired.

Thus, it will be seen that I have provided a machine which not only allows bindings to be formed rapidly and economically, but which can be readily arranged to produce bindings of different sizes and of different forms.

While I have described only the preferred form of my invention, it will be obvious to any skilled mechanic that many minor and even major changes may be made in its construction without departing from the broad spirit of my invention. It will be understood, therefore, that the following claims, which define what I have invented, are not to be limited to the precise details which I have shown and described but are to be broadly interpreted so as to include any structures which fall within their terms or which are the equivalent of the structures defined.

I claim as my invention:

1. In an apparatus for forming plastic bindings, an arbor having a deep narrow longitudinal slot and a plate having a depression in the upper surface thereof, means for rolling said arbor over said plate including means for initially supporting said arbor in said depression the depth of said depression being such that said arbor may rest therein with said slot just above and parallel to the plane of said flat surface.

2. In an apparatus for forming plastic bindings, a plate, a carriage movable along said plate from an initial position, an arbor resting on said plate and having a longitudinal slot, means on said carriage for positioning said arbor with respect thereto, while permitting rotation thereof and means for holding said arbor in a predetermined angular position with said slot parallel to said plate when said carriage is in said initial position, said last named means being automatically releasable when said carriage is moved from said initial position.

3. In an apparatus for forming plastic bindings, a plate, a carriage movable along said plate from an initial position, a socket rotatably mounted on said carriage and adapted to receive one end of an arbor, and means located at a fixed point along said plate for holding said socket in a predetermined angular position when said carriage is in its initial position.

4. In an apparatus for forming plastic bindings, a plate, a carriage movable along said plate, an arbor means on said carriage for moving said arbor therewith in a plane parallel to and over said plate, bearings movably mounted on said carriage, and a roller carried by said bearing, said roller being movable from a position behind the position of said arbor to a position in front thereof, said carriage remaining in a substantially horizontal position while said roller is moved from behind said arbor to the front of said arbor.

5. In an apparatus for forming plastic bindings, a plate, a carriage movable along said plate, an arbor means on said carriage for moving said arbor therewith in a plane parallel to and over said plate, arms pivoted to said carriage below and behind the position of said arbor, bearings on said arms, and a roller carried by said bearings said arms being pivotally mounted on said carriage and being constructed and arranged to allow said roller to be swung over from behind the position of said arbor to a position in front thereof, and a sheet of flexible material fixed relative to said plate behind said carriage and extending forward over said roller and down behind and under said arbor and thence forward along said plate, said sheet being wrapped substantially around said arbor when said roller is swung from said first position to said second position.

6. In an apparatus for forming plastic bindings, a carriage, a bearing carried by said carriage at one side thereof and vertically movable with respect thereto, a member journalled in said bearing and adapted to receive one end of an arbor in a single predetermined angular relation, and releasable means for holding said member in a predetermined angular position with respect to its own axis of rotation.

7. In an apparatus for forming plastic bindings, a frame, a carriage movable on said frame, a bracket carried by said carriage and vertically movable at one side thereof, a member rotatably carried by said bracket and shaped to receive one end of an arbor in a single predetermined angular relation, said member having a notch therein and a spring-pressed detent carried by said frame and positioned to engage the notch in said member and releasably hold said member in a predetermined angular position when said carriage is in a predetermined position.

8. In an apparatus for forming plastic bindings, a plate, a strip of cloth fixed adjacent one end of said plate and extending to the other end thereof, a carriage movable along said plate and adapted to rotatably receive an arbor extending across said plate above said cloth, a roller on said carriage for releasably holding said cloth partially around said arbor, means at said other end of said plate for holding said cloth taut, and means for rendering said last mentioned means ineffective.

9. In an apparatus for forming plastic bindings, a plate, a strip of cloth fixed adjacent one end of said plate and extending to the other end thereof, a carriage movable along said plate and adapted to rotatably receive an arbor extending across said plate above said cloth, a roller on said carriage for releasably holding said cloth partially around said arbor, means at said other end of said plate for holding said cloth taut, and means between said last mentioned means and said carriage for releasably gripping said cloth.

10. In an apparatus for forming plastic bindings, a plate, a strip of cloth fixed adjacent one end of said plate and depending over the other end thereof, a carriage movable along said plate and adapted to rotatably receive an arbor extending across said plate above said cloth, a roller on said carriage for releasably holding said cloth partially around said arbor, means acting on the depending portion of said cloth for holding said cloth taut, and means at said other end of said plate for gripping said cloth and preventing movement thereof in response to said last mentioned means.

11. In an apparatus for forming plastic bindings, a plate, a strip of cloth fixed adjacent one end of said plate and depending over the other end thereof, a carriage movable along said plate and adapted to rotatably receive an arbor extending across said plate above said cloth, a roller on said carriage for releasably holding said cloth partially around said arbor, means acting on the depending portion of said cloth for continually urging said portion in a downward direction, means for clamping said cloth at said other end of said plate, and means operated by the approach of said carriage to said other end of said plate for actuating said clamping means.

CHARLES EDWARD EMMER.